July 19, 1949.   F. G. CLARK   2,476,584
CONTROL ACTUATOR AND CONTROL SYSTEM
Filed Aug. 23, 1945   2 Sheets-Sheet 1
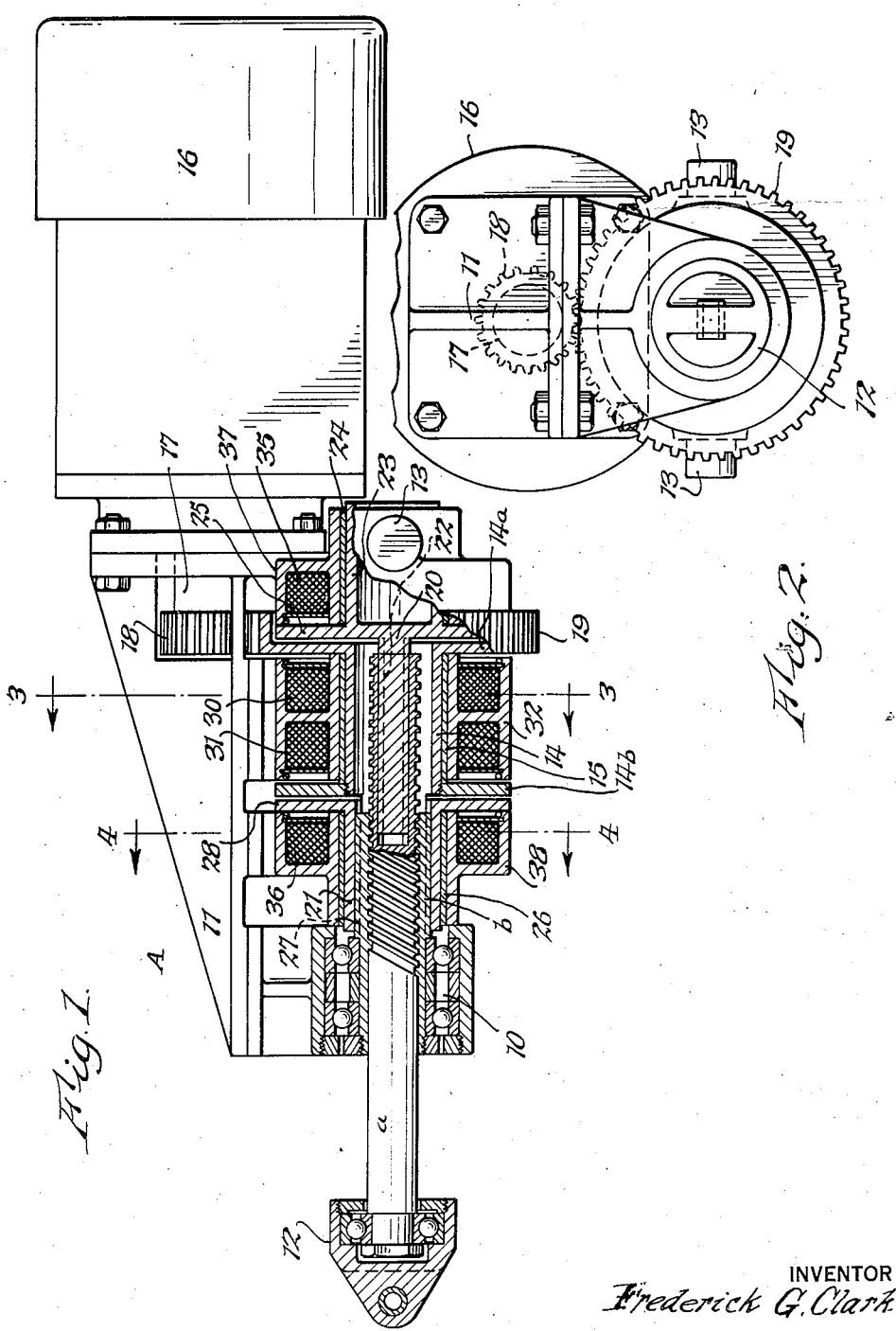
INVENTOR
Frederick G. Clark,
BY
ATTORNEYS July 19, 1949.　　　　F. G. CLARK　　　　2,476,584
CONTROL ACTUATOR AND CONTROL SYSTEM
Filed Aug. 23, 1945　　　　　　　　　　2 Sheets-Sheet 2
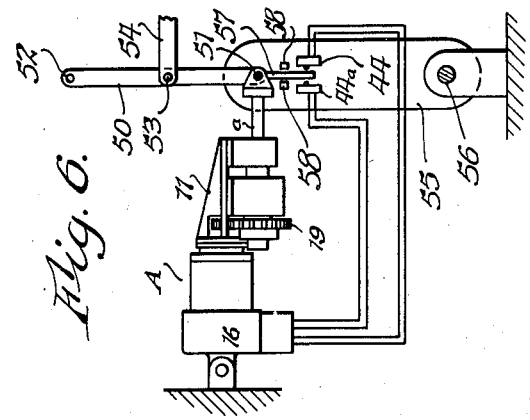
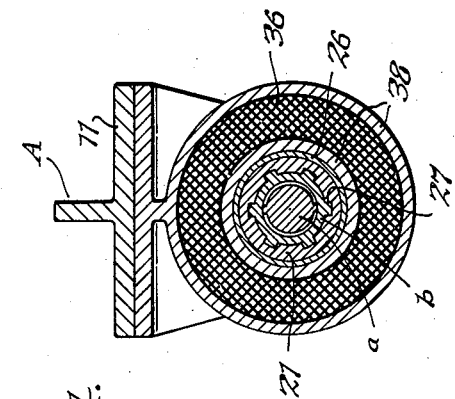
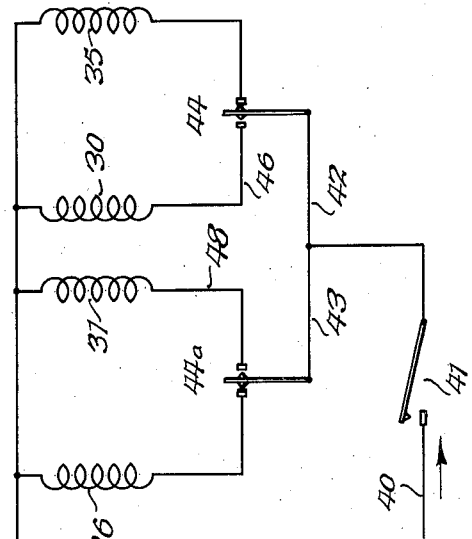
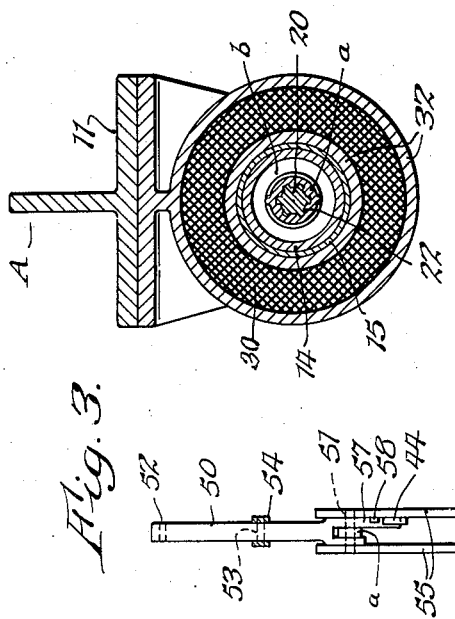
INVENTOR
Frederick G. Clark,
BY
ATTORNEYS Patented July 19, 1949

2,476,584

UNITED STATES PATENT OFFICE 2,476,584

CONTROL ACTUATOR AND CONTROL SYSTEM

Frederick G. Clark, Buffalo, N. Y., assignor to Eastman Machine Company, Buffalo, N. Y.

Application August 23, 1945, Serial No. 612,249

13 Claims. (Cl. 74—424.8)

This invention relates to actuators such as power operated actuators which comprise screw and nut members having screw-threaded engagement and act by the rotation of one member to move the other member axially or linearly for shifting or adjusting an associated movable control element or other device. Such actuators are used, for example, in aircraft, one screw member of the actuator being rotated by an electric motor for effecting required adjustments of a rudder, aileron, wing flap or other control element of the aircraft.

One object of my invention is to provide an actuator of the sort mentioned having an unidirectional operating motor, which, if desired, though not necessarily, may run continuously, and by which either the screw or the nut member of the actuator may be driven to thereby produce motion by the actuator in either of opposite directions.

Other objects of the invention are to provide a screw actuator or jack screw of non-self-locking type in which either the screw or nut member may be rotated by the operating motor to effect axial or linear motion of one actuator member in either of opposite directions, or the rotating member is released from the motor in the event of failure of motive power, or may be readily so released when desired to permit free rotation thereof, and thereby enable manual operation of the actuator and the device which it actuates; to provide a screw actuator with electromagnetic clutch and brake means operable for coupling either the screw or nut member for rotation by the motor and holding the other member, or for holding both actuator members from movement in neutral position, or for freeing the actuator members to enable movement of the linearly movable member manually or independently of the operating motor; to provide an actuator of a construction enabling the efficient operation thereof by a uni-directional motor of low starting torque, such as an alternating current motor, or an under-powered motor of a kind that can be left running continuously with fly wheel effect, if required, to store energy for cycles of short duration; and to provide a power-driven screw actuator in which, in the event of power failure, brake means for the actuator members are instantly released, making the device immediately ready for manual operation.

Another object of the invention is to apply an actuator of the character mentioned as a power-operated booster in a control system so as to enable the operator to perform the control operation either manually only, or by power, in such manner as to give the operator the "feel" or control of the operation, as in the case of a purely manual actuation of the control element.

Further objects and advantages of the invention will appear from the following specification of the preferred embodiment of the invention shown in the accompanying drawings, and the novel features of the invention are set forth in the appended claims.

Fig. 1 is a view partly in side elevation and partly in longitudinal section, of a linear actuator embodying my invention.

Fig. 2 is an end elevation thereof.

Fig. 3 is a transverse sectional view thereof on line 3—3, Fig. 1.

Fig. 4 is a transverse, sectional view thereof on line 4—4, Fig. 1.

Fig. 5 is a diagram of the electric brake and clutch control system.

Fig. 6 is a more or less schematic view in side elevation illustrating the actuator as a booster in an aircraft control system.

Fig. 7 is an end elevation of the lever mechanism shown in Fig. 6.

In the preferred embodiment of the invention illustrated in the drawings, the actuator A comprises a screw member or screw-threaded shaft $a$ and a nut member $b$ which are relatively rotatable and through which nut member the screw member passes with screw-threaded engagement with the internal thread of the nut member. Preferably, these actuator members are rotatably mounted by arranging the nut member $b$ to rotate and be held from axial movement in a suitable bearing 10, shown as a double end thrust ball bearing mounted in a suitable supporting frame 11. As shown, the screw $a$ is provided at one end with a suitable swivel head 12 for connecting it directly or indirectly, as through leverage means, with the device to be actuated, and the frame 11 is connected, as pivotally, by trunnions 13, with a relatively fixed bracket or part against which the actuator reacts in operation.

14 represents a rotary element which surrounds and is adapted to rotate about the actuator screw in a suitable bearing 15. This rotary element, which is preferably of annular spool-like form comprising a tubular body or sleeve provided at opposite ends with outwardly extending annular flanges 14a and 14b, is rotated by a suitable motor 16 which is suitably mounted on the supporting frame 11 and may drive the rotary element 14, as by a pinion 18 on the motor shaft 17 meshing with gear teeth 19 on one flange 14a of the rotary element. Preferably, the motor 16 is an uni-directional electric motor which may, if desired, though not necessarily, run continuously and thus rotate the rotary element 14 continuously in one direction, for transmitting its rotation either through the medium of a coupling member 20 to the actuator screw $a$ or through the medium of a second coupling member 21 to the nut $b$ of the actuator. The coupling member 20 shown comprises a central shaft which extends into an axial hole in the actuator screw and has a splined or non-circular connection 22 with the screw which permits axial movement of the screw relatively to the coupling member 20, but causes the screw to rotate with the coupling member. Coupling member 20 has a tubular outer end portion 23 arranged to rotate in a suitable bearing 24 on the frame 11 and an annular flange or disk 25 projecting outwardly parallel with and adjacent to the outer face of flange 14a of the rotary element 14. The other coupling member 21 is shown as of tubular form arranged to rotate in a suitable bearing 26 on frame 11 and surrounds and has a splined or non-circular connection 27 with the actuator nut $b$, but causes the nut to rotate with it. Coupling member 21 is provided at one end with an annular flange or disk 28 which projects outwardly adjacent to and parallel with the outer face of the other flange 14b of rotary element 14.

30 and 31 represent two electric magnet clutch coils arranged in an iron or magnetic annular core 32 which surrounds the tubular body of the rotary member 14 and is suitably fixed in the supporting frame 11. When electrically energized, the coil 30 sets up magnetic flux in the adjacent flange 14a of the rotary element, and the other coil 31 sets up magnetic flux in the opposite flange 14b of the rotary element, whereby energization of coil 30 acts to attract the disk 25 of the coupling member 20 to rotate with rotary element 14, and energization of coil 31 acts to attract the disk of the other coupling member 21 to rotate with the rotary element. Thus either the coupling member 20 may be caused to rotate with the rotary element and rotate the actuator screw $a$, or the other coupling member 21 may be caused to rotate with the rotary member and rotate the actuator nut $b$.

Two electromagnetic brakes having coils 35 and 36 are provided, the one, 35, for holding the coupling member 20 and screw $a$ from rotation when the nut $b$ is being rotated by operation of clutch coil 31, and the other, 36, for holding the coupling member 21 and nut from rotation, when the screw is being rotated by operation of the clutch coil 30. As shown, the brake coil 35 is arranged in a stationary magnet annulus 37 on the supporting frame 11 adjacent the outer face of the disk 25 of the screw coupling member 20, and the other brake coil 36 is similarly arranged in the stationary magnet annulus 38 on the supporting frame adjacent the outer face of the disk 28 of the nut coupling member 21. When the brake coil 35 is energized, it will hold the coupling member 20 and actuator screw $a$ from rotation and permit axial movement of the screw in one direction by operating the clutch coil 31 to rotate the other coupling member and nut $b$; and conversely, when the brake coil 36 is energized, it will hold the coupling member 21 and nut from rotation, and permit opposite axial movement of the actuator screw by operation of its clutch coil 30 to rotate the coupling member 20 and screw $a$.

Referring to the electric circuit diagram, Fig. 5, a power line 40 controlled by a main or override switch 41 is connected by branches 42 and 43 respectively with limit switches 44 and 44a, preferably single pole, double throw switches. One switch 44 in its normal position, shown in Fig. 5, closes the circuit from the power line through the brake coil 35 and energizes this coil to hold the coupling member 20 and actuator screw $a$ stationary and, in its other position, opens this brake circuit and closes the circuit through a conductor 46 and the clutch coil 30 to energize the latter and cause rotation of the coupling member 20 and actuator screw by the rotary element 14; whereas the other limit switch 44a, in its normal position shown in Fig. 5, closes the circuit from the power line through the other brake coil 36 to hold the coupling member 21 and actuator nut stationary, while in the other position of this second switch 44a, it cuts out the brake coil 36 to free the actuator nut $b$, and closes the circuit through a conductor 48 and the second clutch coil 31 to cause rotation of the coupling member 21 and actuator nut $b$. When the actuator is in neutral or stationary, both switches 44, 44a are automatically held, as by spring action, in their normal positions shown, so that both brakes are energized and both the screw $a$ and nut $b$ of the actuator are held from rotation and act to hold the device operated by the actuator from movement, whereas the operator, by throwing the switch 44, can deenergize the brake coil 35 to release the screw and energize the clutch coil 30 to rotate the screw, thereby moving it axially or linearly in one direction; while by throwing the other switch 44a the operator can deenergize the brake coil 36 to free the actuator nut $b$ and energize the second clutch coil 31 to cause rotation of the nut and thereby move the actuator screw $a$ axially or linearly in the opposite direction. When the switch 44 is operated for rotating the screw $a$ the other switch 44a remains in the normal position shown and energizes the brake coil 36 to hold the nut stationary, and vice versa, when the second switch 44a is operated to energize the clutch coil 31 and rotate the nut $b$, the first switch 44 remains in normal position and energizes the brake for holding the screw $a$ from rotation.

In case of failure of the electric current, or whenever the operator desires to operate the control device manually, and simply opens the main or override switch 41 to cut off the current for such purpose, both brake coils will be deenergized and free the actuator screw $a$ and nut $b$ for rotation. The actuator screw $a$ can then be moved manually in either direction by endwise pressure thereon in the desired direction and the freely rotating nut will permit such linear or axial movement of the screw and the control element which it operates. The jack screw or screw actuator is of a non-self-locking type in which the thread or screw connection between the screw and nut members is of sufficient pitch or of such anti-frictional construction as to enable one member to be moved axially in either direction by end pressure thereon if the other member is released so as to be free to rotate.

Thus, the operator, by a simple actuation of one or the other of the limit switches 44 or 44a, can cause power or motor operation of the linearly movable member of the actuator in either direction desired, or by simple actuation of the main or override switch 41, can free the actuator members for manual operation of the linearly movable member of the device in either direction desired.

The improved actuator herein disclosed has various distinct advantages over existing actuators or systems, among which may be mentioned the following:

1. It permits the use of an uni-directional motor which can be left running continuously, if required, thereby eliminating excessive power surge caused by frequent starting and/or reversing of the actuator motor.

2. It enables the use of a motor with low starting torque, such for example as an alternating current motor which has many desirable features, but due to its inherent low starting torque characteristics, has heretofore been impractical in many actuator applications.

3. This system permits the use of an under-powered motor of a kind that is operable with fly wheel effect to store energy for cycles of short duration.

4. In the described braking system for the actuator members, a non-self-locking jack screw can be used having a high pitch or antifriction screw thread arrangement, which has better mechanical efficiency than a jack screw of self-locking type.

5. In the event of power failure or, if required or desired by the operator, the brake means are or can be instantly released, and with the non-self-locking jack screw, the actuator is ready for manual operation.

A desirable application of an actuator of the character disclosed herein is as a power booster in a manually operable control system, as for aircraft and the like. Figs. 6 and 7 illustrate diagrammatically one such application of the actuator. In said figures, 50 represents a lever fulcrumed at 51 and to which the manually operable pilot control stick is connected at 52, through the medium of a suitable leverage altering system (not shown), if necessary, for operating the lever manually. This lever is connected at 53 to a link 54 which is operatively connected to the element to be controlled. If it be assumed that fulcrum 51 of the lever 50 is a fixed fulcrum, we have a simple lever where the ratio of force applied to the work done is as the length 52—51 to the length 53—51. If by the use of such a simple lever arrangement one could get enough linear movement of link 54, the problem would be simple. But it so happens that the usual control surface must be moved a distance relatively great compared to the movement of the pilot's stick, so that the distance lost by the leverage gain is regained in the means illustrated in Figs. 6 and 7, by utilizing the actuator A to move the lever fulcrum 51 in the direction of the force exerted at 52 on lever 50. To accomplish this, as shown, the fulcrum 51 of lever 50 is movably or shiftably mounted, as for example, by placing it on the free end of a second lever 55, which has a fixed fulcrum 56, and the linearly movable member a of the booster actuator A is connected coincidentally to the lever 55 with the fulcrum 51. The two limit switches 44 and 44a are mounted on the lever 55 and are actuated by an extension 57 of the first lever 50. The movement of lever 50 about its fulcrum relatively to lever 55 may be limited, by stops 58 on lever 55 at opposite sides of the extension 57. When the lever 50 is moved manually in either direction about the fulcrum 51, the switch for moving the actuator member a in that direction is thrown by the extension 57 of lever 50, and the actuator a will operate until it has advanced the fulcrum 51, by movement of the lever 55 about its fulcrum 56, to the required position. When that point is reached, the extension 57 on lever 50 no longer presses on the movable switch member and the linear motion by the screw actuator A ceases. This switch-operating movement of the lever 50 is limited by the stops 58, and when the lever extension 57 is in engagement with either stop, the levers 50 and 55 act as a single lever of the 3rd class. The booster ratio is determined by the leverage applied by the combination lever 50—55. The use of an actuating system such as described and illustrated in Figs. 6 and 7, for instance in an airplane for actuating a control surface, gives the pilot the feel of the varying loads as the position of the surface is changed. That is an important feature of the described booster principle which a straight power system does not have.

The pilot or operator, by means of the main or override switch 41, which may be located wherever most convenient for operation, can shut off the current and cut out the power actuator and use manual operation. When the power circuit is broken, the actuator screw is freed for manual linear movement, as explained. The booster system disclosed, by the use of suitable lever arrangements, can be made to give any desired booster ratio.

Referring to the herein before mentioned use with the actuator of an under-powered motor with fly wheel effect, such a motor could be the conventional squirrel cage induction motor, the outer shell or stator of which is the stationary member of the motor. In such a motor, as is well known, the stator consists of a number of turns of copper wire wound into the slots in the core with the winding insulated from the core. The rotating member consists of a cylindrical iron core with a number of equally spaced holes running axially through the core slightly below the surface thereof. Solid bare copper bars are driven into these holes and at each end the bars are riveted into a copper end plate, so that the copper and iron core are joined together as a mass and are not insulated from each other. When the stator or wound member is energized, it sets up a magnetic field in the stator and an induced field in the rotor which causes its rotation. With such a motor, a fly wheel may be suitably connected to rotate with the rotor.

However, in the motor with the fly wheel effect that is preferred for use with the herein disclosed actuator, the outer shell is the solid member with iron core and copper bars and the inner or cylindrical member is the wound part of the motor, and this wound cylinder or member is held stationary, and the solid outer shell rotates. This gives the rotating mass a longer radius and consequently greater inertia without increasing the overall size of the motor and without materially increasing its weight. In other words, by using this type of motor, the effect of an attached separate fly wheel is obtained from the motor itself.

I claim as my invention:

1. In a linear actuator having two members operatively connected for axial movement of one member by rotation of either member in the same direction, the improved construction comprising means rotatably mounting said members and holding one member from axial movement, brake means for separately holding either of said members from rotation, a uni-directional rotary driving element, and means operable to separately couple either of said actuator members to said driving element for rotation therewith while actuating said brake means to hold said other member from rotation for moving one of said actuator members axially in one or another direction.

2. In combination with screw and nut members having screw-threaded engagement, means rotatably mounting said screw and nut members and holding one member from axial movement, a rotary driving element, clutch means for rotating said screw member with said driving element, clutch means for rotating said nut member with said driving element, brake means for separately holding said screw and nut members from rotation, and control means for said clutch and brake means operable to cause rotation of either one of said screw and nut members by said driving element while holding the other of said members from rotation for causing opposite axial movements of one of said members.

3. In combination with a jack screw comprising a screw member and a nut member having screw-threaded engagement, means rotatably mounting said jack screw members and holding one from axial movement while permitting axial movement of the other, a rotary driving element, clutch means for separately rotating either of said jack screw members with said driving element in the same direction, brake means for separately holding said jack screw members from rotation, and control means for said clutch and brake means operable to cause rotation of either jack screw member by said driving member while holding the other member from rotation.

4. In combination with screw and nut members having screw-threaded engagement, means rotatably mounting said members and holding one member from axial movement while permitting axial movement of the other member, a rotary driving element rotatable in a single direction, clutch means for separately coupling said screw and nut members to said rotary element for rotation therewith, brake means for separately holding said screw and nut members from rotation, and control means operable to cause said clutch and brake means to rotate either one of said screw and nut members while holding the other of said members from rotation.

5. In combination with screw and nut members having screw-threaded engagement, means rotatably mounting said members and holding one member from axial movement while permitting axial movement of the other member, a rotary driving element, a uni-directional motor for rotating said rotary element, clutch means for coupling either said screw member or nut member separately to said rotary element for rotation therewith, brake means for separately holding said screw and nut members from rotation, and control means for said clutch and brake means operable to cause rotation of either of said screw and nut members while holding said other of said members from rotation.

6. In combination with screw and nut members having screw-threaded engagement, means rotatably mounting said members and holding one member from axial movement while permitting axial movement of the other member, a rotary element rotatable in a single direction, clutch means for separately coupling said screw and nut members to said rotary element for rotation therewith, brake means for separately holding said screw and nut members from rotation, and control means for said clutch and brake means operable to cause rotation of either one of said screw and nut members by said rotary element while holding the other of said members from rotation, said control means being also operable to release both the screw and nut members from said clutch and brake means to permit relative axial movement of said screw and nut members by axial pressure on one of said members.

7. In combination with rotatably mounted screw and nut members having screw-threaded engagement, a rotary driving element, electric clutch means for coupling said driving element to one of said screw and nut members for rotating it, electric clutch means for coupling said driving element to the other of said members for rotating it, electric brake means for holding one of said screw and nut members from rotation, electric brake means for holding the other of said members from rotation, and control means operable for simultaneously energizing the clutch means for either of said screw and nut members to rotate it, and energizing the brake means for the other of said members to hold it from rotation.

8. In combination with screw and nut members having screw-threaded engagement, means rotatably mounting said members and holding one member from axial movement while permitting axial movement of the other member, a rotary driving element rotatable in a single direction, an electric clutch for coupling one of said members to rotate with said rotary element, an electric clutch for coupling said other member to rotate with said rotary element, electric brakes each for holding one of said screw and nut members from rotation, and control means operable to simultaneously energize the clutch for either of said members to rotate it, and energize the brake for the other of said members to hold it from rotation.

9. In combination with rotatably mounted screw and nut members having screw threaded engagement, a rotary driving element, electric clutch means for rotating one of said screw and nut members with said driving element, electric clutch means for rotating the other of said members, electric brake means for holding one of said screw and nut members from rotation, electric brake means for holding the other of said members from rotation, and control means operable for simultaneously energizing the clutch means for either of said screw and nut members to rotate it, and energizing the brake means for the other of said members to hold it from rotation, said control means also operable to simultaneously deenergize said clutch and brake means for both said screw and nut members to free both of said members.

10. In combination with rotatably mounted screw and nut members having screw-threaded engagement for moving one member axially by rotating the other member, a rotary element, means for rotating said element in one direction, a screw-actuating member connected to rotate with and move axially of said screw member, a nut-actuating member connected to rotate with and move axially of said nut member, electromagnetic clutch coils one for coupling said screw-actuating member to turn with said rotary element and another for coupling said nut-actuating member to rotate with said rotary element, electromagnet brake coils one for holding said screw-actuating member from rotation and the other for holding said nut-actuating member from rotation, and control means for said clutch and brake coils.

11. In combination with a jack screw comprising rotatably mounted screw and nut members having screw-threaded engagement a spool rotatable about said jack screw and having annular flanges at opposite ends, means for rotating said spool, a screw-actuating member connected to rotate with and move axially of said screw and having an annular flange adjacent one end flange of said spool, a nut-actuating member connected to rotate with and move axially of said nut and having an annular flange adjacent the opposite end flange of said spool, electromagnetic coils surrounding said spool one for causing said screw-actuating member to turn with said spool and the other for causing said nut-actuating member to turn with said spool, electromagnetic brakes surrounding said jack screw one adjacent to the flange of said screw-actuating member and the other adjacent to the flange of said nut-actuating member, and control means for said clutch and brake coils for rotating one of said screw and nut-actuating members while holding the other of said screw or nut-actuating members from rotation.

12. In combination with rotatably mounted screw and nut members having screw-threaded engagement for moving one member axially by rotating the other member, a rotary element, means for rotating said element in one direction, a screw-actuating member connected to rotate with and move axially of said screw member, a nut-actuating member connected to rotate with and move axially of said nut member, electromagnetic clutch coils one for coupling said screw-actuating member to turn with said rotary element and another for coupling said nut-actuating member to rotate with said rotary element, electromagnet brake coils one for holding said screw-actuating member from rotation and the other for holding said nut-actuating member from rotation, and control means for said clutch and brake coils comprising means operable to energize the clutch coil and deenergize the brake coil for either of said screw and nut-actuating members, and means for simultaneously deenergizing all of said clutch and brake coils.

13. In combination with a jack screw comprising screw and nut members having screw threaded engagement, means rotatably mounting said members and holding one member from axial movement while permitting axial movement of the other member, an annular driving element rotatable about said jack screw, means for rotating said driving element, a screw-actuating member connected to rotate with and move axially of said screw, a nut-actuating member connected to rotate with and move axially of said nut, electric clutch means carried by said driving element, one for causing said screw-actuating member to turn with said driving element and the other for causing said nut-actuating mechanism to turn with said driving element, electric brakes surrounding said jack screw, one adjacent to said screw-actuating member and the other adjacent to said nut-actuating member, and control means for said clutch means and brakes for causing rotation of one of said screw and nut-actuating members while holding the other of said screw or nut-actuating members from rotation.

FREDERICK G. CLARK.

REFERENCES CITED

The following references are of record in the file of this patent:

UNITED STATES PATENTS

| Number | Name | Date |
| --- | --- | --- |
| 885,945 | Moore | Apr. 28, 1901 |
| 1,398,973 | Smith | Dec. 6, 1921 |
| 1,416,182 | Farmer | May 16, 1922 |
| 1,819,697 | Bondette | Aug. 18, 1931 |
| 1,847,693 | Kindervater | Mar. 1, 1932 |
| 2,315,110 | Dornier | Mar. 30, 1943 |
| 2,383,901 | Werner | Aug. 28, 1945 |